United States Patent
Graze, Jr. et al.

[11] Patent Number: 5,365,773
[45] Date of Patent: Nov. 22, 1994

[54] ENGINE BLOWBY MEASURING APPARATUS

[75] Inventors: Russell R. Graze, Jr., Dunlap; Wayne A. Supak, Washington, both of Ill.

[73] Assignee: Caterpillar Inc., Peoria, Ill.

[21] Appl. No.: 30,956

[22] Filed: Mar. 12, 1993

[51] Int. Cl.$^5$ .............................................. G01M 3/00
[52] U.S. Cl. ..................................................... 73/47
[58] Field of Search ................ 73/119 R, 117.3, 47, 73/19.04, 19.12, 23.24, 23.31, 23.42; 123/41.86, 572

[56] References Cited

U.S. PATENT DOCUMENTS 3,754,538  8/1973  Ephraim, Jr. et al. ............ 123/41.86
4,719,792  1/1988  Eriksson ............................ 73/117.3

FOREIGN PATENT DOCUMENTS 4246217  9/1992  Japan ................................ 123/41.86

Primary Examiner—Robert Raevis
Attorney, Agent, or Firm—Frank L. Hart

[57] ABSTRACT

An apparatus for measuring gaseous blowby a piston of an operating internal combustion engine. The apparatus have a heating and filtering system which function to increase the accuracy of the resultant measurements. The orientation of the conduit, flow meter, and the control of oil sump pressures also contribute to improved accuracy and ease of operation.

12 Claims, 1 Drawing Sheet

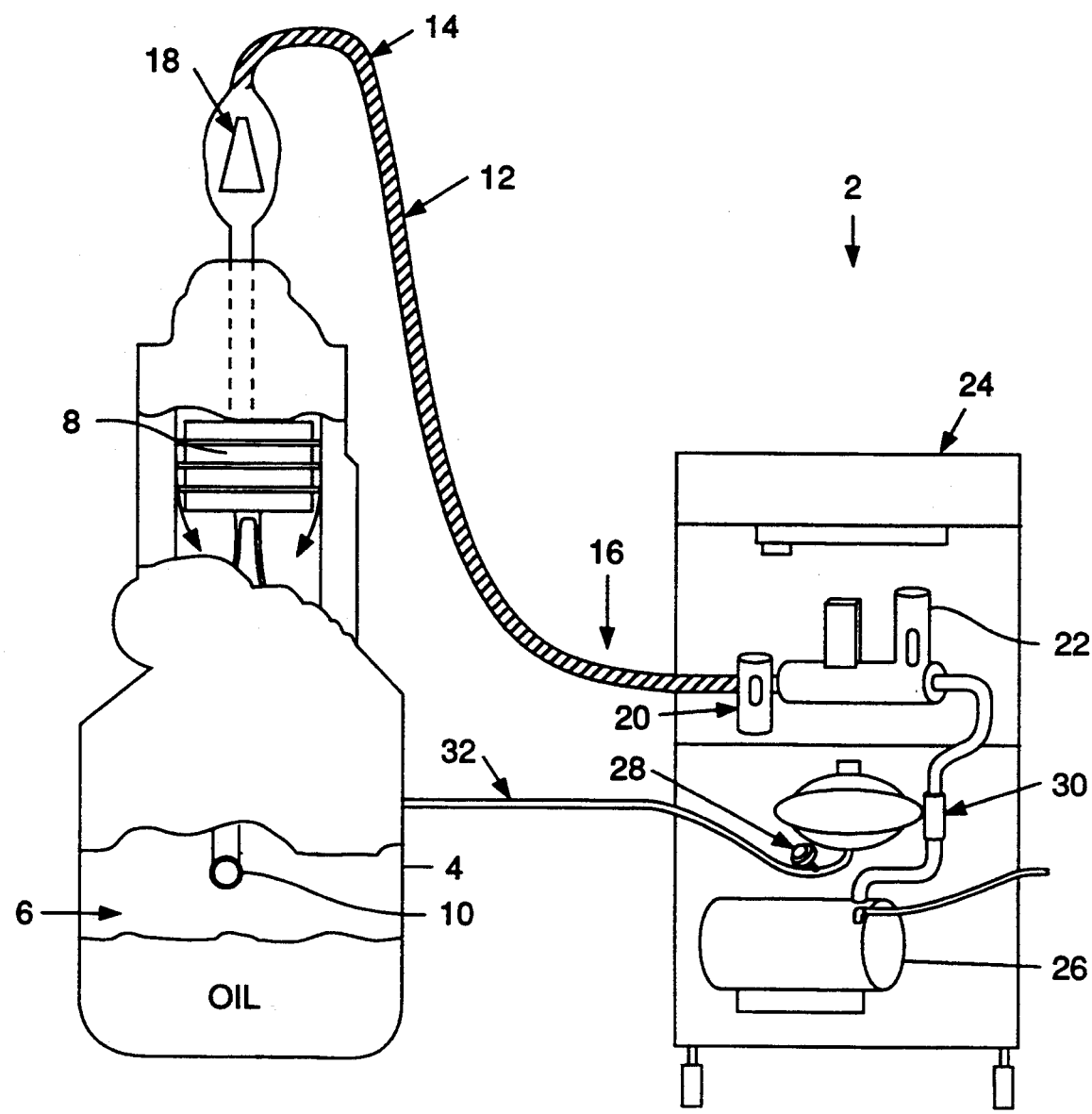

ENGINE BLOWBY MEASURING APPARATUS

TECHNICAL FIELD

This invention relates generally to apparatus for measuring the amount of gasses blowing by the pistons of an operating internal combustion engine.

BACKGROUND ART

Apparatus for measuring blowby of gasses past the pistons of an internal combustion engine are known in the art. These heretofore utilized apparatus generally had features which decreased the accuracy of the resultant measurement. Entrained water in the form of droplets was one of the major problems. Previous devices either removed the water from the flow stream, thus reducing accuracy; or kept the water in the flow stream with subsequent short term measurement functionally due to fouling of the flow meter by the mixture of water and other blowby constituents. Some used heavy filtering to clean the flow stream which resulted in a back pressure on the engine which was detrimental to normal engine operation. The present invention is directed to overcoming one or more of the problems of presently available apparatus.

DISCLOSURE OF THE INVENTION

In one aspect of the invention, an apparatus is provided for measuring the blowby of gasses past a piston of an internal combustion engine. The engine has an oil sump positioned below and in communication with the piston and an opening positioned above a liquid level in the sump and in communication with gasses in the oil sump.

A conduit has first and second end portions and is connectable at the first end portion to the opening. Means are provided for maintaining the conduit at a preselected temperature and for filtering particulate from fluid passing through the conduit.

A thermal flow meter is connected to and is in communication with the conduit and is adapted to measure the mass flow rate of gasses delivered from the engine by the conduit. A means is connected to and positioned downstream of the thermal flow meter for maintaining the gaseous pressure within the oil sump at preselected values.

BRIEF DESCRIPTION OF THE DRAWINGS

The drawing is a diagrammatic view of the apparatus of this invention.

BEST MODE FOR CARRYING OUT THE INVENTION

Referring to the drawing, the subject invention relates to an apparatus 2 for measuring blowby of gasses past a piston of an internal combustion engine 4. The engine 4 has an oil sump 6 positioned below and in communication with the engine's pistons 8. The engine has an opening 10, preferably the air breather opening of the oil sump, positioned above a liquid level in the oil sump and in communication with gasses in the oil sump, as is well known in the art.

A conduit 12 has first and second end portions 14, 16 and is connected at the first end portion 14 to the opening 10 for receiving gasses from the oil sump 6 and directing these gasses to the apparatus 2 for measurement. In the preferred embodiment, the first end portion 14 of the conduit 12 extends from the opening 10 generally upwardly to a first filter 18. By so elevating the conduit 12 droplets of liquid, principally oil, that might be entrained in the gaseous stream flowing through the conduit 12 will generally fall out and return to the sump 6.

The first filter 18 is provided for removing particulate material, including oil, from the gaseous stream. The first filter 18 preferably is a metal sintered filter, more preferably a 10 micron bronze sintered filter. A second filter 20 is also preferably associated with the second end portion 16 of the conduit 12. The second filter 20 is preferably a 0.3 micron filter provided to remove smaller particulate and soot that passes the first filter 18.

The conduit 12 is heated to a preferred temperature in excess of 60 degrees Centigrade. By so heating the gasses passing through the conduit 12, any water associated with the blowby gasses will be vaporized. This heating of the gaseous stream not only aids in separating water from any entrained oil, but also provides more accurate blowby measurement since the water is a combustion product. As is known in the art, blowby gasses generally include about 7% to about 12% water which will skew measurement, which erroneous factor can not be corrected by extrapolation. Further, water is detrimental to the operation of the hereafter more fully described flow meter 22. Heating of the conduit 12 can be by any means known in the art, preferably by an electric strip heater.

An oven 24, preferably an electric oven, is provided to house the measuring/controlling equipment and maintain the gaseous sample at a temperature in excess of 60 degrees Centigrade. The oven 24 houses a thermal flow meter 22 which is connected to a vacuum pump 26, a pressure transducer 28, and a vacuum regulator 30 with only the flow meter 22 being positioned within and heated by the oven 24.

The thermal flow meter 22 is connected to and is in communication with the second end portion 16 of the conduit 12. The thermal flow meter 22 is adapted to receive the heated gasses from the conduit 12, measure the mass flow rate of gasses, and deliver a signal in response to said measurement. The vacuum pump 26, vacuum regulator 30 and pressure transducer 28 are connected to the discharge end of the thermal flow meter 22. The vacuum regulator 30 and associated pressure transducer 28 are connected to the oil sump 6 above the liquid level via a feedback line 32. These pressure controlling apparatus are well known in the art and are provided for maintaining the gaseous pressure within the oil sump at preselected values, preferably in the range of about −0.5 to about 1.0 inch of water. By so regulating the pressure within the oil sump 6 at about atmospheric pressure, the operation of the blowby measuring apparatus will not cause a back pressure and alter the operating characteristics of the engine 4.

In order to further facilitate accurate measurement, the thermal flow meter 22 is preferably oriented so that passage of gasses through the flow meter 22 is in a general upward direction which thereby further protects against hydrocarbon droplet contamination of the flowmeter's capillary tube.

In the preferred embodiment, apparatus for reading out measured flow, and the temperature and pressure readouts and controls (not shown) are positioned outside the enclosure 25 for easy access.

INDUSTRIAL APPLICABILITY

In the operation of the apparatus 2 to measure blowby of gasses about the piston, the temperature of the oven 24 and conduit 12 are elevated to their preferred range in excess of about 60 degrees Centigrade. The vacuum on the engine is set for about −0.7 to about −0.5 inches of water and the engine is then started.

Starting of the engine 2 will generally cause the oil sump pressure to increase to about −0.3 to −0.4 inches of water. The engine 4 is then warmed up at high idle, low load and then load is slowly added to reach a rated condition. The sump pressure will slowly rise and preferably stabilize at a pressure in the range of 0.1 to 0.5 inches of water. If the pressure exceeds about 1.5 inches of water, the pump vacuum should be increased and the system re-tuned at the low idle and rated conditions.

The blowby measurements obtained therefore indicate piston ring performance and identify ring failure and are helpful in designing engines which operate efficiently.

Other aspects, objects and advantages of this invention can be obtained from a study of the drawings, the disclosure and the appended claims.

We claim:

1. An apparatus for measuring blowby of gasses past a piston of an internal combustion engine, said engine having an oil sump positioned below and in communication with the piston and an opening positioned above a liquid level in the sump and in communication with gasses in the oil sump, comprising:

a conduit having first and second end portions and being connectable at the first end portion to the opening;

first means for maintaining the conduit at a preselected temperature;

second means for filtering particulate from fluid passing through the conduit;

a thermal flow meter connected to and being in communication with the conduit and adapted to measure the mass flow rate of gasses delivered from the engine by the conduit; and fourth means connected to and being positioned downstream of the thermal flow meter for maintaining the gaseous pressure within the oil sump at preselected values.

2. An apparatus, as set forth in claim 1, wherein the second means includes a first metal sintered filter.

3. An apparatus, as set forth in claim 2, wherein the first filter is a bronze sintered filter associated with the first end portion of the conduit.

4. An apparatus, as set forth in claim 1, wherein the thermal flow meter is adapted to measure the mass rate of gaseous flow through the meter and deliver a signal responsive to said flow rate.

5. An apparatus, as set forth in claim 1, wherein the fourth means includes a vacuum pump and a vacuum regulator.

6. An apparatus, as set forth in claim 1, wherein the fourth means maintains the gaseous pressure in the range of about −0.5 inch of water to about 1 inch of water.

7. An apparatus for measuring blowby of gasses past a piston of an internal combustion engine, said engine having an oil sump positioned below and in communication with the piston and an opening positioned above a liquid level in the sump and in communication with gasses in the oil sump, comprising:

a conduit having first and second end portions and being connectable at the first end portion to the opening;

first means for maintaining the conduit at a preselected temperature;

second means for filtering particulate from fluid passing through the conduit;

a thermal flow meter connected to and being in communication with the conduit and adapted to measure the mass flow rate of gasses delivered from the engine by the conduit;

fourth means connected to and being positioned downstream of the thermal flow meter for maintaining the gaseous pressure within the oil sump at preselected values; and fifth means for maintaining at preselected temperatures the temperature of gasses discharging from the conduit.

8. An apparatus, as set forth in claim 7, wherein the gases are maintained by the fifth means at a temperature greater than about 60 degrees Centigrade.

9. An apparatus for measuring blowby of gasses past a piston of an internal combustion engine, said engine having an oil sump positioned below and in communication with the piston and an opening positioned above a liquid level in the sump and in communication with gasses in the oil sump, comprising:

a conduit having first and second portions and being connectable at the first end portion to the opening;

first means for maintaining the conduit at a preselected temperature;

second means for filtering particulate from fluid passing through the conduit;

a thermal flow meter connected to and being in communication with the conduit and adapted to measure the mass flow rate of gasses delivered from the engine by the conduit; and fourth means connected to and being positioned downstream of the thermal flow meter for maintaining the gaseous pressure within the oil sump at preselected values;

wherein the first means maintains the temperature of gasses passing through the conduit at a temperature greater than about 60 degrees Centigrade.

10. An apparatus for measuring blowby of gasses past a piston of an internal combustion engine, said engine having an oil sump positioned blow and in communication with the piston and an opening positioned above a liquid level in the sump and in communication with gasses in the oil sump, comprising:

a conduit having first and second end portions and being connectable at the first end portion to the opening;

first means for maintaining the conduit at a preselected temperature;

second means for filtering particulate from fluid passing through the conduit;

a thermal flow meter connected to and being in communication with the conduit and adapted to measure the mass flow rate of gasses delivered from the engine by the conduit; and fourth means connected to and being positioned downstream of the thermal flow meter for maintaining the gaseous pressure within the oil sump at preselected values;

wherein the thermal flow meter is oriented in a direction adapted for the passage of the gasses through the flow meter in a general upward direction.

11. An apparatus for measuring blowby of gasses past a piston of an internal combustion engine, said engine having an oil sump positioned below and in communication with the piston and an opening positioned above a liquid level in the sump and in communication with gasses in the oil sump, comprising:

a conduit having first and second end portions and being connectable at the first end portion to the opening;

first means for maintaining the conduit at a preselected temperature;

second means for filtering particulate from fluid passing through the conduit wherein the second means includes a first filter associated with the first end portion of the conduit and a second filter associated with the second end portion of the conduit;

a thermal flow meter connected to and being in communication with the conduit and adapted to measure the mass flow rate of gasses delivered from the engine by the conduit; and fourth means connected to and being positioned downstream of the thermal flow meter for maintaining the gaseous pressure within the oil sump at preselected values.

12. An apparatus, as set forth in claim 11, wherein the portion of the conduit downstream of the first filter extends generally upwardly.

* * * * *